United States Patent

[11] 3,551,653

[72] Inventors Yuzuru Yanagisawa Kanagawa-Ken; Shinji Kusunoki, Tokyo, Japan
[21] Appl. No. 772,638
[22] Filed Nov. 1, 1968
[45] Patented Dec. 29, 1970
[73] Assignee Sony Corporation Shinagawa-ku, Japan a corporation of Japan
[32] Priority Nov. 2, 1967
[33] Japan
[31] No. 42/70428

[54] NUMBER AND SYMBOL DISPLAY SYSTEM
9 Claims, 13 Drawing Figs.

[52] U.S. Cl. .......... 235/92, 340/378
[51] Int. Cl. .......... H03k 21/34, 21/34, H03k 21/18
[50] Field of Search .......... 235/92, (66560, 70, 73, 68); 340/378, 9

[56] References Cited
UNITED STATES PATENTS 3,358,125 12/1967 Rinaldi .......... 235/92
3,392,270 7/1968 Boucke .......... 235/92

*Primary Examiner*—Maynard R. Wilbur
*Assistant Examiner*—Joseph M. Thesz, Jr.
*Attorneys*—Albert C. Johnston, Robert E. Isner, Lewis H. Eslinger and Alvin Sinderbrand

ABSTRACT: In a number and symbol display system for an electronic computer in which those digit portions of the register that do not contain codes representing digits of an effective number to be displayed initially contain 0 representing codes and hence would each normally result in the display of futile 0, the sequential output of the register is detected for futile 0's and, in response to the detection of such futile 0's, a symbol code, for example, representing the symbol "-," is supplied to the register to substitute for the coded futile 0 at the digit position which is one or two digit positions higher than that of the most significant digit of the effective number, and further in response to the detection of futile 0's redundancy code is supplied to the register either to substitute for the 0 codes at digit positions higher than the said most significant digit, that is, for futile 0 codes, or to substitute for the 0 codes representing digits of the effective number to be displayed. After such substitution of the symbol code and redundancy code in the contents of the register, the register output is sequentially supplied to a display device which either does not decode the redundancy code, or does not decode the 0 code and decodes the redundancy code as representing 0, whereby to display the effective number without futile 0's and with the symbol either one or two digit positions higher than the position of the most significant digit of the displayed number.

Figure 1:
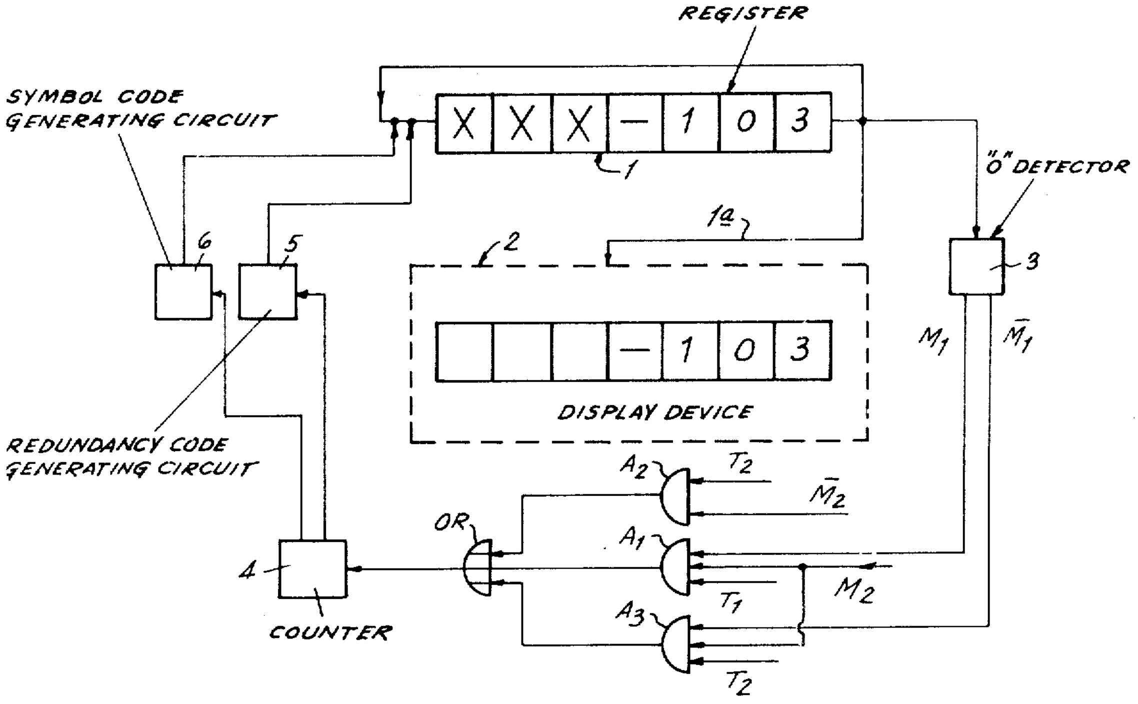

INVENTORS.
YUZURU YANAGISAWA
SHINJI KUSUNOKI
BY
Lewis H. Eslinger
ATTORNEY.

INVENTORS
YUZURU YANAGISAWA
SHINJI KUSUNOKI
BY
[signature]
ATTORNEY

PATENTED DEC 29 1970

3,551,653

SHEET 3 OF 4

INVENTOR.
YUZURU YANAGISAWA
SHINJI KUSUNOKI
BY
[signature]
ATTORNEY

INVENTORS
YUZURU YANAGISAWA
SHINJI KUSUNOKI
BY
[signature]
ATTORNEY.

NUMBER AND SYMBOL DISPLAY SYSTEM

This invention relates generally to a number and symbol display system for electronic computers, and more particularly to such a system for serially displaying a number and symbol.

With conventional number and symbol display systems for electronic computers, when the content of a register is, for example, −00000000005, it is the usual practice to display such content as −00000000005. Thus, difficulty is experienced in reading the displayed effective number, that is, the number 5 in this example, since futile or unnecessary 0's are displayed in the digit positions higher than that of 5.

To avoid such difficulty, it has been proposed to display − 5 rather than 00000000005 by eliminating such futile 0's. However, difficulty is still encountered in reading the displayed effective number with the symbol, since there is an unnecessarily great spacing between the displayed symbol "−" and the displayed effective number 5.

Accordingly, it is an object of this invention to provide a number and symbol display system for electronic computers by which an effective number having fewer digits than the number of digit portions in the display device is displayed in the latter without futile 0's and a symbol is displayed at a digit position sufficiently close to that of the most significant digit of the displayed number so as to facilitate the accurate reading of the displayed number and symbol.

Thus, when the content of a register to be admitted to a serial display device is −00000000005, as in the above case for example, it is preferably displayed as −5 or as − 5. That is, the symbol "−" is displayed at a position higher by one or two digit positions than that of the most significant digit of the displayed effective number.

In accordance with an aspect of this invention, the foregoing objects are achieved in a number and symbol display system, in which those digit portions of the register that do not contain codes representing digits of the number to be displayed initially contain representing codes, by detecting futile 0's in the sequential output of the register, supplying symbol code to the register in response to the detection of futile 0's to substitute such symbol code for futile 0 code at the digit position which is one or two digit positions higher than that of the most significant digit of the number to be displayed, supplying redundancy code to the register, also in response to the detection of futile 0's, either to substitute the redundancy code for the futile 0 codes or for the 0 codes representing digits of the number to be displayed, whereby any 0 digits of the number to be displayed are represented by codes that are distinctive in respect to the codes at the positions of futile 0's, and, following the aforesaid substitutions of symbol code and redundancy code, sequentially supplying the register output to a display device having a plurality of digit portions each capable of displaying selectively a symbol and any digit from 0 to 9, inclusive, and being inoperative to decode the futile 0 code content in the register output.

The above, and other objects, features and advantages of this invention, will be apparent in the following detailed description of illustrative embodiments thereof which is to be read in connection with the accompanying drawings, wherein:

FIG. 1 is a block diagram of a number and symbol display system for electronic computers in accordance with an embodiment of this invention; and FIGS. 2 to 13, inclusive, are timing tables illustrating various modes of operation of the system according to the invention.

Referring now to FIG. 1, it will be seen that the reference numeral 1 represents a register the content of which is sequentially supplied, as indicated at 1*a*, to a display device 2 and decoded therein so as to be sequentially displayed by the display device 2.

Such arrangement is similar to that of the conventional serial display system, and therefore detailed description thereof will be omitted. Assuming, for example, that the number of digit portions of the register 1 is seven, as shown, and that the computed result or output from a key board (not shown) is −10.3, then the content of register 1 is 000010.3. Thus, if the output of the register 1 representing said content is imparted to the display device 2 as it is, the device 2 will display −00010.3 with futile 0's indicated at the fourth to sixth digit positions, of course, assuming that six digit portions are provided for numerical display in the display device 2 and the seventh digit portion is reserved for the display of a symbol.

However, this is not the case in the system according to the present invention. In accordance with the present invention, logic circuits are provided which make possible the display of − 10.3 or −10.3, that is, with the symbol "−" displayed at a position higher by one or two digit positions than that of the most significant digit of a displayed effective number, as will be described below.

More specifically, as shown on FIG. 1, the content sequentially taken from register 1 is admitted to a 0 detecting circuit 3 which in turn provides a 0 detection output $M_1$ and a nonzero detection output $\overline{M}_1$ .

Supplied to an AND circuit $A_1$ are the output $M_1$, a signal $T_1$ occurring continuously during the first word period of register 1 and a signal $M_2$ which commences with the arrival of a decimal point timing signal $T_P$ and continues to the end of the word period. The output of AND circuit $A_1$ is supplied through an OR circuit OR to a counter 4 by which the number of 0's at digit positions higher than the position of the decimal point in the content of register 1 is counted. Further, a signal $T_2$ occurring continuously during the second word period and a NOT output $\overline{M}_2$ of the signal $M_2$ are supplied to 0) AND circuit $A_2$, and the output of the latter is supplied through OR circuit OR to counter 4 by which the number of digits (including 0) at the digit positions lower than the position of the decimal point in the content of register 1 is counted. The output $\overline{M}_1$, , signal $T_2$ and output $M_2$ are supplied to an AND circuit $A_3$, and the output of the latter is supplied through OR circuit OR to the counter 4 by which the number of digits (excluding 0) at the digit positions than that of the decimal point in the content of register 1 is counted. It is to be noted that the counter 4 is designed to be operated, that is, to have its content reduced by one, by a count pulse which arrives first after an output of OR circuit OR is imparted to the counter.

Where register 1 has seven digit portions, as shown, counter 4 is made to count a like number, that is, to have its content reduced from 0 to 6, 5, 4, 3, 2, 1 and back to 0. Each output from AND circuit $A_1$ occurring during a particular digit time in the first word period of register 1 causes the content of counter 4 to be reduced by one, for example, from 0 to 6 or from 5 to 4, at the beginning of the next digit time. Similarly, each output from AND circuit $A_2$, or from AND circuit $A_3$, occurring during a particular digit time in the second word period causes the content of counter 4 to be reduced by one at the beginning of the next digit time.

In order to display a symbol at a digit position higher by one digit position than that of the most significant digit of a displayed effective number, a symbol code generating circuit 6 is provided under the control of counter 4 to supply symbol code to register 1 during the one digit time immediately after the digit time in the second word period when the content of the counter 4 becomes 0. Further, during each digit time in the second word period subsequent to said one digit time when symbol code is supplied to register 1, a redundancy code generating circuit 5 also controlled from counter 4 is made to supply redundancy code to register 1. On the other hand, if the symbol is to be displayed at a position higher by two digit positions than that of the most significant digit of the displayed effective number, then, during the second word period, the symbol code available from symbol code generating circuit 6 is admitted to register 1 during the one digit time that is later by two digit times than the digit time when the content of counter 4 becomes 0, and the redundancy code X available from redundancy code generating circuit 5 is imparted to register 1 during the one digit time that intervenes between the digit time when the content of counter 4 becomes 0 and the one digit time when symbol code is admitted to register 1, and also during each of the digit times in the second word period following the said one digit time when symbol code is admitted to the register.

Figure 2:
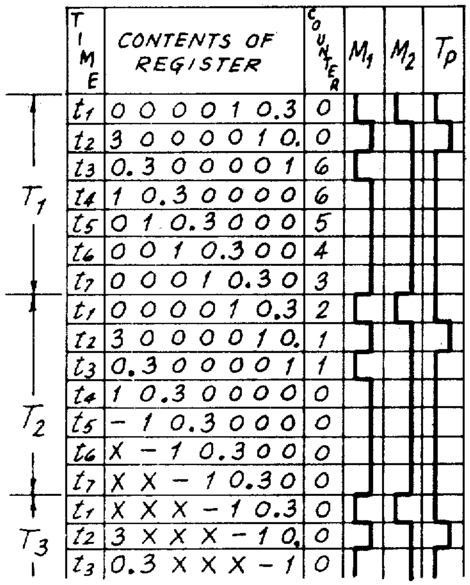
Figure 3:
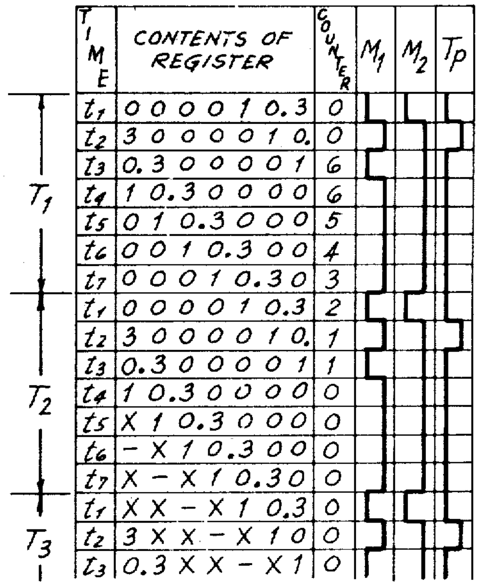

The relationships of the content of the counter 4, outputs $M_1$ and $M_2$ and timing pulse $T_P$ to the content of the register 1 are as shown in FIG. 2 in the case where a symbol is to be displayed at a position higher by one digit position than that of the most significant digit of a displayed effective number, and as shown in FIG. 3 in the case where a symbol is to be displayed at a position higher by two digit positions than that of the most significant digit of a displayed effective number. From FIGS. 2 and 3, it will be seen that the content of register 1, at the commencement of the third word period, becomes XXX—10.3 in the former case and XX—X10.3 in the latter case.

The steps which the foregoing substitutions are effected in the content of register 1 will be specifically described with reference to FIG. 2. It will be seen that the contents of register 1 appear in the output of the latter in ascending order of significance, that is, in the order 3, 0, 1, 0, 0, 0 and 0 during each of the first two word periods. Thus, the signal $M_1$ indicating a 0 code in the register output occurs in the digit times $t_2$ and $t_4$—$t_7$. Since the decimal point, in the example given, is located between the first and second digit positions, the decimal point timing pulse $T_P$ may be made to occur in digit time $t_2$, and, in response to the pulse $T_P$, the signal $M_2$ may be made to commence in digit time $t_2$ and to continue through digit time $t_7$. With the foregoing timing of signals $M_1$ and $M_2$, there is an output $(M_1{**}M_2T_1)$ from AND circuit $A_1$ during the first word period in each of the digit times $t_2$, $t_4$, $t_5$, $t_6$ and $t_7$, that is, five outputs from $A_1$ to indicate that there are five 0's a digit position higher than the location of the decimal point. Thus, at the commencement of the second word period, the content of counter 4 has been reduced to 2. During the second word period, at which time signal $T_2$ exists, there is an output $(\overline{M_2}\cdot T_2)$ from AND circuit $A_2$ only in digit time $t_1$ to indicate that there is only one digit at a position lower than the decimal point and to cause the content of counter 4 to be reduced to 1 in digit time $t_2$, and then there is an output $(\overline{M_1}\cdot M_2)$ from AND circuit $A_3$ only in digit time $t_3$ to indicate that there is only one digit other than 0 at positions higher than the decimal point and to cause the content of counter 4 to be reduced to 0 in digit time $t_4$ of the second word period.

In response to the reduction of the content of counter 4 to 0, symbol code generating circuit 6 is operated, as by conventional control circuitry, to supply code representing the symbol "—" to register 1 in substitution for the 0 code then issuing in the register output, whereby, at the next digit time $t_4$, the content of the register includes the symbol code at a digit position that is one digit position than that of the most significant digit of the effective number to be displayed. Further, in response to the reduction of the content of counter 4 to 0 in digit time $t_4$, redundancy code generating circuit 5 is operated, as by conventional control circuitry providing a one digit time delay, to supply redundancy code to register 1 in substitution for the 0 code issuing from the register output in each of the remaining digit times of the second word period following the symbol code substitution, whereby, at the end of the second word period, that is, in digit time $t_1$ of the third word period, the content of register 1 has been converted to XXX—10.3. Thus, the symbol code appears at the digit position that is one digit position higher than that of the most significant digit of the number to be displayed, and all 0 codes at digit positions higher than that of the most significant digit (with the exception of the 0 code replaced by symbol code) are replaced by redundancy code X.

In the case of FIG. 3, it will be seen that the counting by counter 4 proceeds in the same manner as described above with reference to FIG. 2, whereby to reduce the content of counter 4 to 0 in digit time $t_4$ of the second word period. However, the conventional control circuitry for the redundancy code generating circuit 5 and for the symbol code generating circuit 6 is modified to cause circuit 5 to supply redundancy code X to register 1 in the one digit time immediately following the reduction of the counter content to 0, to cause circuit 6 to supply symbol code "—" to the register 1 in the next digit time, and finally to cause circuit 5 to supply redundancy code X to register 1 in each of the digit times remaining in the second word period after the digit time in which symbol code is supplied to the register. Thus, at the end of the second word period, that is, in the digit time $t_1$ of the third word XX—X10.3. In such content, the symbol code appears at the digit position that is two digit positions higher than that of the most significant digit of the number to be displayed, and all 0 codes at digit positions higher than that of the most significant digit (with the exception of the 0 code replaced by symbol code) are replaced by redundancy code X.

Following the above described substitutions in the content of register 1, the output of the latter is sequentially supplied to display device 2 as a serial output of 3–0–1–"—"–X–X–X in the case of FIG. 2 and as a serial output of 3–0–1–X–"—"–X–X in the case of FIG. 3. The redundancy codes X are not decoded in display device 2 so that —10.3 is displayed in the former case, and — 10.3 in the latter case. In this way, futile 0's are prevented from being displayed, and yet the symbol "—" is displayed at a digit position higher by one or two digit positions than that of the most significant digit of the displayed effective number. Thus, the intended purpose is achieved.

Although, in the above-described embodiments of the invention, redundancy codes X are substituted for the content of the register 1 in digit positions higher than that of the most significant digit of an effective number to be displayed, with the exception of the digit position where the symbol code is substituted, displays similar to those described above can also be produced by substituting redundancy code X for any necessary 0 code representing a digit of the effective number to be displayed, and by arranging display device 2 so that the 0 content is not decoded therein, but the redundancy code X is decoded as content representing 0.

When the system of FIG. 1 is thus modified, 0 code content occurring at the output of register 1, from the start of the second word period to the digit time in that word period when the content of counter 4 is reduced to 0. is replaced by redundancy code X from circuit 5 which is suitably controlled to supply the redundancy code to the input side of register 1 in response to each detection of 0 code by detector 3 in the time from the inception of the second word period to the digit time when counter 4 counts down to 0. However, after counter 4 counts down to 0 during the second word period, and 0 codes appearing in the output of register 1 during that work period are not replaced by redundancy codes, but rather are shifted as 0 codes to the input side of the register. Of course, as previously described with reference to FIG. 2, the 0 code appearing in the output of register 1 either in the digit time that immediately follows the reduction of the counter content to 0, or in the next digit time, is replaced by symbol code from circuit 6, which is suitably controlled following the countdown of counter 4 to 0 content.

Figure 4:
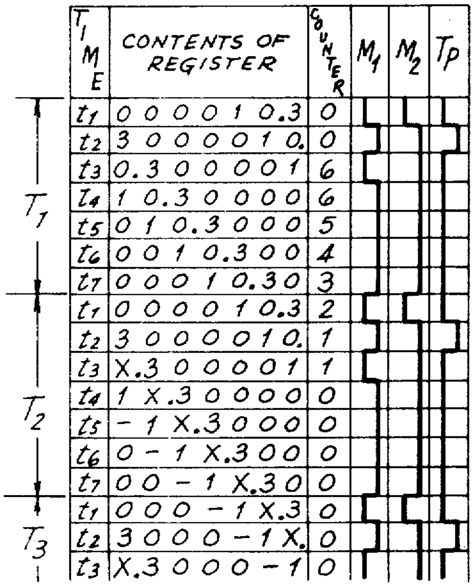

For example, as shown on FIG. 4 which refers to an arrangement for displaying —10.3, that is, the same display as is achieved with the arrangement of FIG. 2, it will be understood that counter 4 is operated as described above in connection with FIG. 2 to reduce the content of the counter to 0 in the digit time $t_4$ of the second word period. From the start of the second word period until the digit time $t_4$ therein, any 0 code appearing in the output of register 1 is replaced by redundancy code X from circuit 5. In the example given, the only 0 code appearing in the register output during the defined interval is that representing the 0 at the digit position immediately above the location of the decimal point and which is at the output end of the register in digit time $t_2$ of the second word period so as to be replaced by redundancy code X in the content of register 1 at the digit time $t_3$. After the content of counter 4 is reduced to 0 in digit time $t_4$, circuit 5 is rendered inoperative so that any 0 codes appearing in the register output for the remainder of the second word period are not replaced by redundancy codes X. Upon the countdown of counter 4 to 0 content in digit time $t_4$, the first 0 code thereafter appearing in the register output is replaced by symbol code "—", whereby at the completion of the second word period, that is, in digit time $t_1$ of the third word period, the content of register 1 is 000-1X.3.

With the modified arrangement of FIG. 4, the display device 2 to receive the sequential output of register 1 during the third and subsequent word periods is modified so as not to decode the 0 codes in such output and further to decode each redundancy code X as representing the digit 0 to be displayed. Thus, the display device will display −10.3, as desired. 00—01X.3

Figure 5:
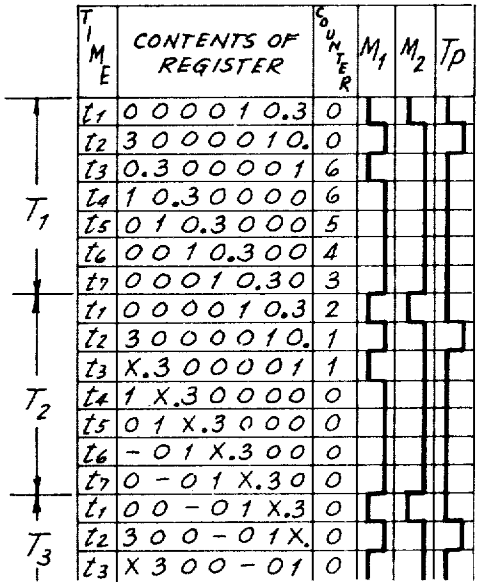

The arrangement illustrated by FIG. 5 is generally similar to that described with respect to FIG. 4, except that the symbol code generating circuit 6 is controlled to supply symbol code to the register at a time digit that is one time digit later than has been described with reference to fig. 4, whereby, at the end of the second word period, the content of the register is 00—01 X.3 to effect the subsequent display of − 10.3, that is, with the symbol "−" being displayed in a digit position that is two digit positions higher than that of the most significant digit of the displayed effective number.

In the embodiments of the invention described with reference to FIGS. 2—5, when the initial content of the register representing a computed result or the output from a keyboard is, for example, 0000.103 with a "—" symbol, such content is displayed by device 2 either as —.103, in the case of FIGS. 2 and 4, or as − .103, in the case of FIGS. 3 and 5. However, if it is desired to provide a display of such content as —0.103 or as − 0.103, that is, with a 0 displayed in the digit position immediately higher than the location of the decimal point, it is only necessary to suitably delay the onset of the signal $M_2$ by one digit time in respect to the digit time when decimal point timing pulse $T_P$ occurs, as shown on FIGS. 6, 7, 8 and 9 or to relatively delay the occurrence of the timing pulse $T_P$ by one digit time, with the onset of the signal $M_2$ then occurring in the same digit time as the timing pulse, as shown on FIGS. 10, 11, 12 and 13. In each case, the one digit time delay in the onset of signal $M_2$, which can be achieved by a conventional time delay circuit, results in the content of counter 4 being reduced to 0 during the second word period at a digit time that is one digit time later than would otherwise be the case.

It will be understood that the arrangements of FIGS. 6, 7, 8 and 9 correspond to the arrangements of FIGS. 2, 3, 4 and 5, respectively, and that the arrangements of FIGS. 10, 11, 12 and 13 also correspond to the arrangements of FIGS. 2, 3, 4 and 5, respectively.

Figure 6:
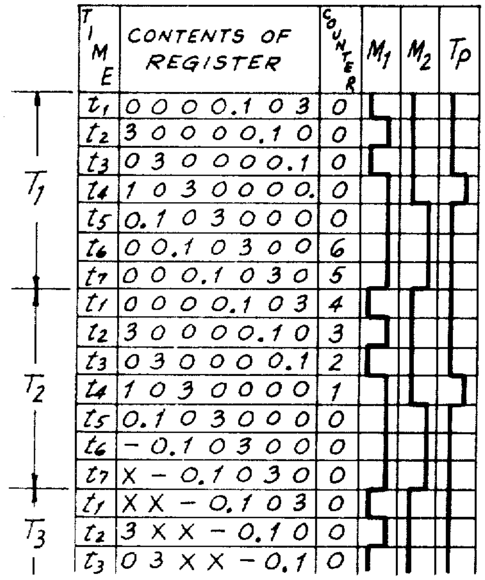
Figure 7:
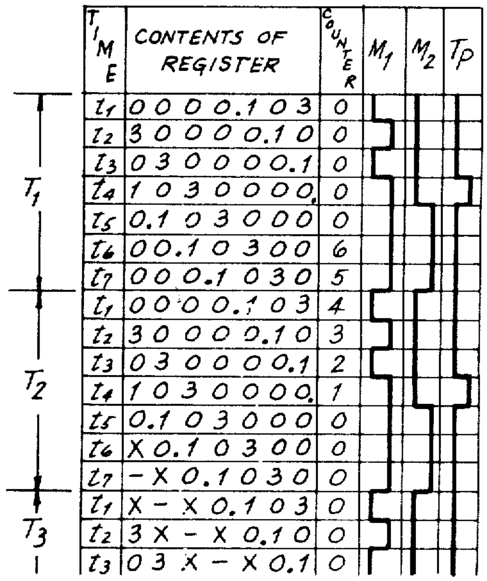
Figure 8:
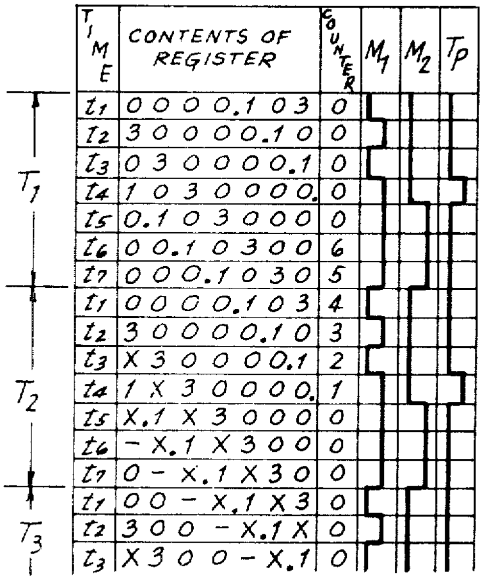
Figure 9:
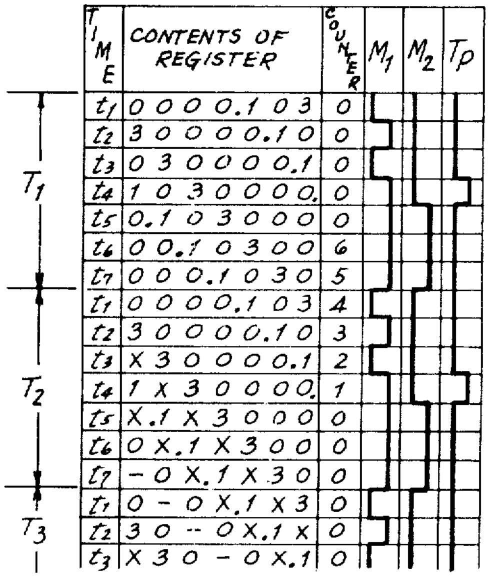
Figure 10:
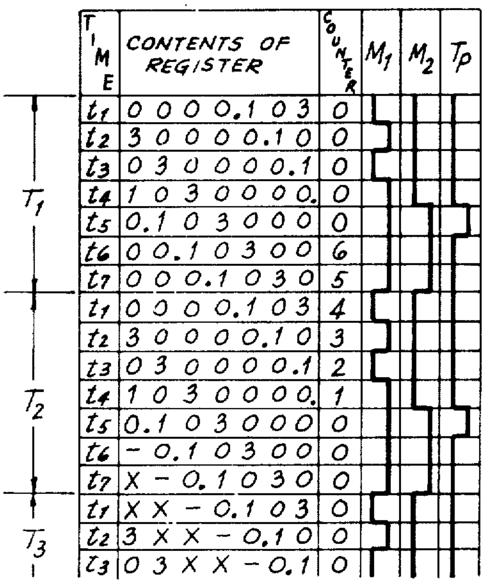
Figure 11:
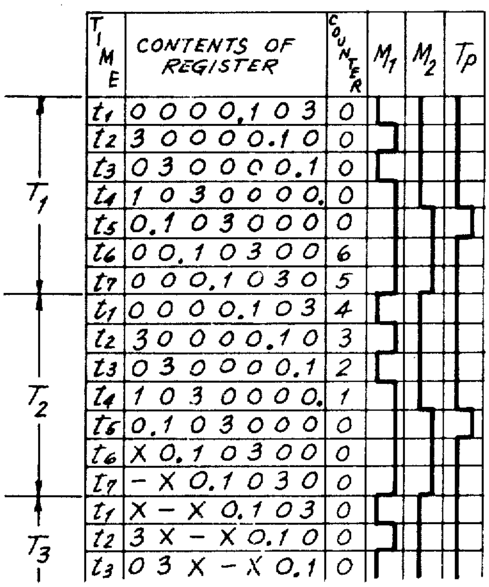
Figure 12:
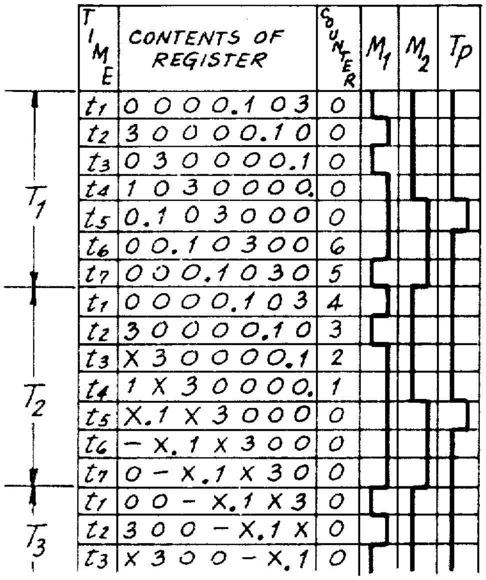
Figure 13:
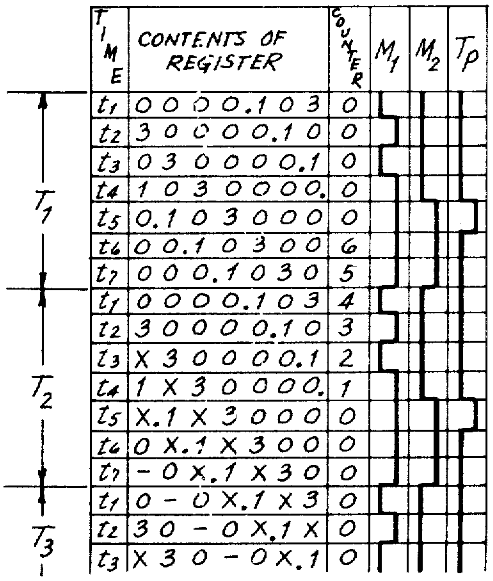

Thus, the arrangements illustrated by FIGS. 6 and 10 each provide a register content of XX—0.103 at the completion of the second word period, while the arrangements of FIGS. 7 and 11 each provide a register content of X−X0.103 at the completion of the second word period, so that, when such contents are sequentially supplied to a display device 2 that does not decode the redundancy code X, a display of —0.103 or of − 0.103, respectively, is obtained. On the other hand, the arrangements illustrated by FIGS. 8 and 12 each provide a register content of 00—X.1X3 at the completion of the second word period, while the arrangements illustrated by FIGS. 9 and 13 each provide a register content of 0—0X.1X3 at the completion of the second word period. The arrangements of FIGS. 8 and 12 and of FIGS. 9 and 13 are intended to be employed with a display device 2 that does not decode the 0 code and that decodes the redundancy code X as representing the digit 0, 1107 whereby the described register contents, when sequentially supplied to such display device, provide displays -0.103 —0.103 and − 0.103, respectively.

In the foregoing, various embodiments of the invention have been described with reference to particular examples wherein a number of relatively small magnitude is to be displayed with the minus symbol. However, it is to be understood that this is for convenience of explanation and by way of example only, and it will be readily apparent to those skilled in the art that the present invention can also be similarly applied to the display of any number with any kind of symbol. It will also be apparent that no limitation is imposed upon the numbers of digit portions included in the register and display device.

Although the foregoing description of preferred embodiments describes the symbol as being displayed at a position higher by one or two digit positions than that of the most significant digit of the displayed effective number; it will be appreciated that such symbol may be displayed at a larger distance, for example, three or four digit positions, from the most significant digit of a displayed effective number, particularly when the displayed number consists of a large number of digits.

Having described illustrative embodiments of the invention with reference to the accompanying drawings, it is to be understood that the invention is not limited to those precise embodiments, and that various changes and modifications obvious to one skilled in the art may be made therein without departing from the scope or spirit of the invention as defined in the appended claims.

We claim:

1. A number and symbol display system for an electronic computer comprising a register having a plurality of digit portions a first group of which contain codes representing respective digits including any 0's of an effective number to be displayed and a second group of which, constituted by the remainder of said digit portions, contain code representing 0, and further having an output in which the code contents of said digit portions appear in sequence, detecting means for the detection in said output of the register of said 0 representing codes, symbol code generating means controlled from said detecting means to supply symbol code to said register in substitution for the code content of the digit portion in said second group which is at a predetermined digit position higher than that of the digit portion having a coded content representing the most significant digit of said effective number to be displayed, redundancy code generating means also controlled from said detecting means to supply redundancy code to said register in substitution for any 0 representing code content of the digit portions of one of said groups other than said digit portion in which said symbol code is substituted, whereby to represent any 0 digits of said effective number to be displayed by codes which are distinctive in respect to codes representing futile 0's, a display device having a plurality of digit portions each capable of displaying selectively a symbol and any digit from 0 to 9, inclusive, and being inoperative to decode the futile 0 code content in said output of the register, and means for sequentially supplying said output of the register to said display device following said substitutions of symbol code and redundancy code so that said display device will display only said effective number and said symbol at said predetermined digit position higher than that of the most significant digit of the displayed effective member.

2. A number and symbol display system according to claim 1, in which said predetermined digit position is from one to two digit positions higher than the digit position of said most significant digit of the effective number.

3. A number and symbol display system according to claim 2, in which said redundancy code is substituted for the code content of each of said digit portions in said second group other than said digit portion in which said symbol code is substituted, and said display device is inoperative to decode said redundancy code content of said output of the register.

4. A number and symbol display system according to claim 2, in which said redundancy code is substituted for any representing code content in the digit portions of said first group, and said display device decodes said redundancy code as 0 and is inoperative to decode said 0 representing code content.

5. A number and symbol display system according to claim 1, in which the content of said register has a decimal point at a predetermined location therein to provide a decimal timing signal commencing at a related digit time in each word period of the register output, said register output has the content of the register appearing sequentially therein in ascending order of significance, said detecting means has outputs at which first and second detection signals are produced in response to detection of said 0 codes and the others of said codes, respectively, said symbol and redundancy code generating means are controlled through counting means having a counting cycle of a number of steps equal to the number of said digit portions in the register, means operative during the first word period of the register output to step said counting means in response to each said first detection signal following the commencement of said timing signal, means operative during the second word period of the register output to step said counting means for each digit time occurring before said commencement of the timing signal, and means operative during said second word period to step said counting means in response to each said second detection signal occurring after said commencement of the timing signal, said symbol code generating means being made operative to supply said symbol code to the register during a single digit time in said second word period which is a predetermined number of digit times following the completion of said counting cycle of the counting means.

6. A number and symbol display system according to claim 5, in which said redundancy code generating means is made operative to supply redundancy code to said register during each digit time in said second word period following said completion of the counting cycle other than said digit time when said symbol code generating means is operative, and said display device is inoperative to decode said redundancy code.

7. A number and symbol display system according to claim 5, in which said redundancy code generating means is made operative to supply redundancy code to said register during said second word period prior to said completion of the counting cycle upon each said detection of 0 code in the register output, and said display device is inoperative to decode said 0 code and decodes said redundancy code as 0.

8. A number and symbol display system according to claim 5, in which said digit time at which the decimal timing signal commences is selected so that, when said location of the decimal point is between the digit position of said most significant digit of the number to be displayed and the next higher digit position, the content of the digit portion of said register at said next higher digit position is other than said code representing 0 at the completion of said second word period.

9. A number and symbol display system according to claim 5, in which said digit time at which the decimal timing signal commences is selected so that, when said location of the decimal point is between the digit position of said most significant digit of the number to be displayed and the next higher digit position, the content of the digit portion of said register at said next higher digit position is said code representing 0 at the completion of said second word period.